US010526181B2

(12) United States Patent
Toler et al.

(10) Patent No.: US 10,526,181 B2
(45) Date of Patent: Jan. 7, 2020

(54) BARRIER SYSTEM FOR PLATFORM LIFTS

(71) Applicant: Honda Motor Co., Ltd., Tokyo (JP)

(72) Inventors: Gregory N. Toler, Celina, OH (US); Shawn Gilbert Coffman, Tipp City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 277 days.

(21) Appl. No.: 15/471,564

(22) Filed: Mar. 28, 2017

(65) Prior Publication Data

US 2018/0282142 A1 Oct. 4, 2018

(51) Int. Cl.

| | |
|---|---|
| ***F16M 11/00*** | (2006.01) |
| ***B66F 17/00*** | (2006.01) |
| ***B66F 7/28*** | (2006.01) |
| ***B66F 7/18*** | (2006.01) |
| ***B66F 7/06*** | (2006.01) |

(52) U.S. Cl.

CPC .............. *B66F 17/00* (2013.01); *B66F 7/065* (2013.01); *B66F 7/18* (2013.01); *B66F 7/28* (2013.01)

(58) Field of Classification Search

CPC .......... B66F 17/00; B66F 17/006; B66F 7/18; F16M 11/24; F16M 2200/00; F16M 13/04

See application file for complete search history.

(56) References Cited

U.S. PATENT DOCUMENTS

| | | | | |
|---|---|---|---|---|
| 748,702 | A | 1/1904 | Conary | |
| 4,499,970 | A | 2/1985 | Hussey | |
| 5,452,489 | A | 9/1995 | Gelder et al. | |
| 6,634,049 | B2 | 10/2003 | Hahn et al. | |
| 6,648,579 | B2 | 11/2003 | Vartanian, Sr. | |
| 7,694,928 | B2 * | 4/2010 | Lee | B60N 3/101 224/281 |
| 8,807,288 | B1 | 8/2014 | Rivera et al. | |
| 2019/0144218 | A1 * | 5/2019 | Hoofard | B65G 69/008 |

FOREIGN PATENT DOCUMENTS

| | | | |
|---|---|---|---|
| GB | 831633 | A1 | 3/1960 |

* cited by examiner

*Primary Examiner* — Amy J. Sterling

(74) *Attorney, Agent, or Firm* — Honda Patents & Technologies North America, LLC; Joshua J. Freier

(57) ABSTRACT

A barrier system for platform lifts to prevent access to an opening once the platform lift is lower than the floor. The system includes a platform lift configured to move in a housing. At least one upright member is receivable in the housing, and is moveable in an up and down direction. A lever is disposed in the housing in a manner in which it will engage with the platform lift as it moves into the housing. The movement of the lever because of this engagement moves the upright member out of the housing to create a barrier.

20 Claims, 5 Drawing Sheets

BARRIER SYSTEM FOR PLATFORM LIFTS

TECHNICAL FIELD

The present disclosure relates generally to barrier systems, and more particularly, but not necessarily entirely, to barrier systems including platform lifts.

BACKGROUND

Barrier systems are commonly used to prevent access to openings in a manufacturing environment. In the automotive vehicle manufacturing industry, parts are typically delivered to the assembly line in containers of varying sizes and configurations. In order for the containers to be at an ergonomic height for part handling, they are commonly placed on platform lifts. However, if the container is not large enough to fill the entire top surface of the platform lift, and the platform lift is lowered below the floor grade, an opening is created between the floor, the platform lift and the container. It would therefore be desirable to provide a barrier to the opening when the platform lift is below the floor grade.

SUMMARY

In accordance with one embodiment of the present disclosure, a barrier system may include a housing and a platform lift configured to move in the housing. At least one upright member is configured to be receivable in the housing, and is moveable in an up and down direction. A lever is disposed in the housing in a manner in which it will engage with the platform lift as it moves into the housing. The movement of the lever as a result of this engagement raises the upright member out of the housing to create a barrier.

In accordance with another embodiment of the present disclosure, a barrier system may include a platform lift configured to move in a housing. At least one upright member is moveable in an up and down direction. A lever is engageable with a fulcrum and an upright member. When the platform lift is moved into contact with the lever, the lever pivots about the fulcrum to move the upright member up to form a barrier.

In accordance with yet another embodiment of the present disclosure, a barrier system may include a platform lift configured to move in a housing. At least one upright member is moveable in an up and down direction. A lever is joined to the upright member with a hinge. When the platform lift is moved into contact with the lever, the lever hinges the upward member up to form a barrier.

BRIEF DESCRIPTION OF THE DRAWINGS

Certain embodiments of the present disclosure will be better understood from the following description taken in conjunction with the accompanying drawings in which.

DETAILED DESCRIPTION

Embodiments are hereinafter described in detail in connection with the views and examples of FIGS. 1-10, wherein like numbers indicate the same or corresponding elements throughout the views. It should, of course, be understood that the description and drawings herein are merely illustrative and that various modifications and changes can be made in the structures disclosed without departing from the concepts of the present disclosure.

Figure 1:
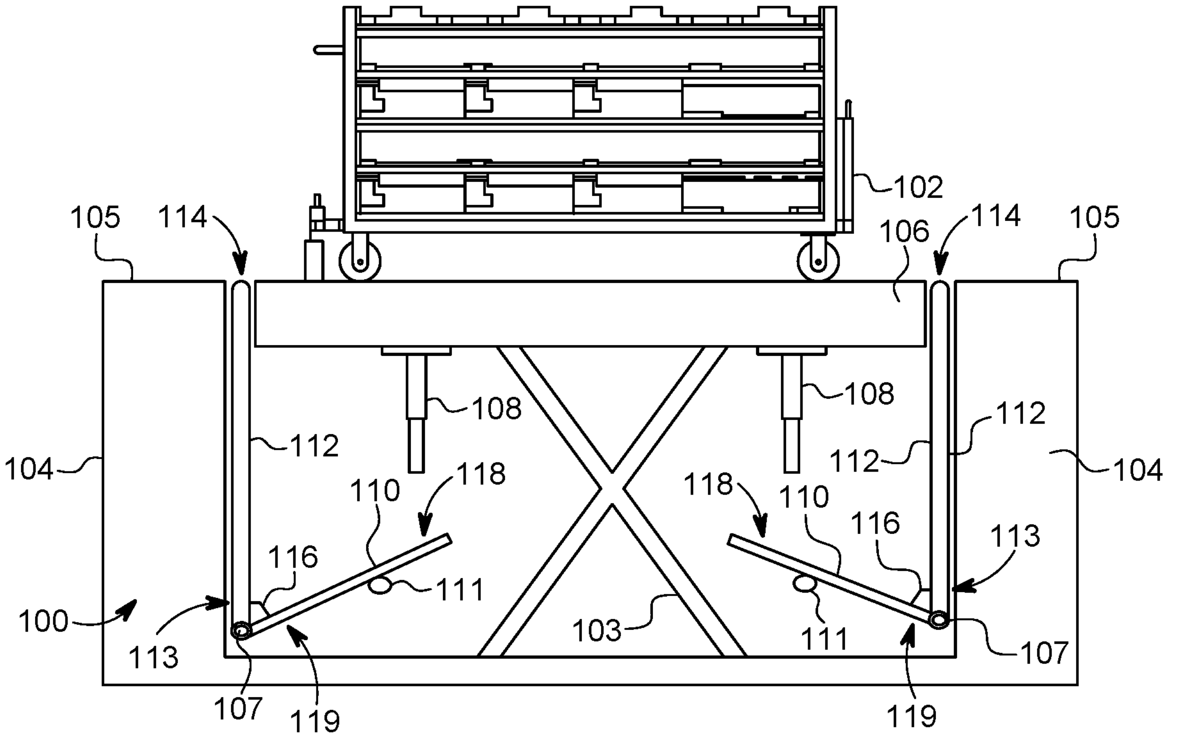
FIG. 1 is a front view of a first embodiment of the present disclosure supporting a cart in a neutral position.

FIG. 1 illustrates a front view of a first embodiment of a barrier system for use with platform lifts indicated generally at 100 in a neutral or non-lowered position. The barrier system 100 of FIG. 1 is shown holding a cart 102. However, it will be understood that the barrier system 100 can be used for any variety of containers, such as boxes, bins, pallets, shelves, crates, cartons and the like. The barrier system 100 may be particularly suited for a manufacturing environment. However, it will be appreciated that the barrier system 100 may be used in other environments where it may be desirable to support a cart or other such object within the scope of the present disclosure.

The barrier system 100 may include a housing 104. However, it will be appreciated that the barrier system 100 may be used in a pit or opening where such a housing is not needed. In the intended environment, an upper surface 105 of housing 104 is a floor or other surface where people may walk to approach a cart 102.

Figure 2:
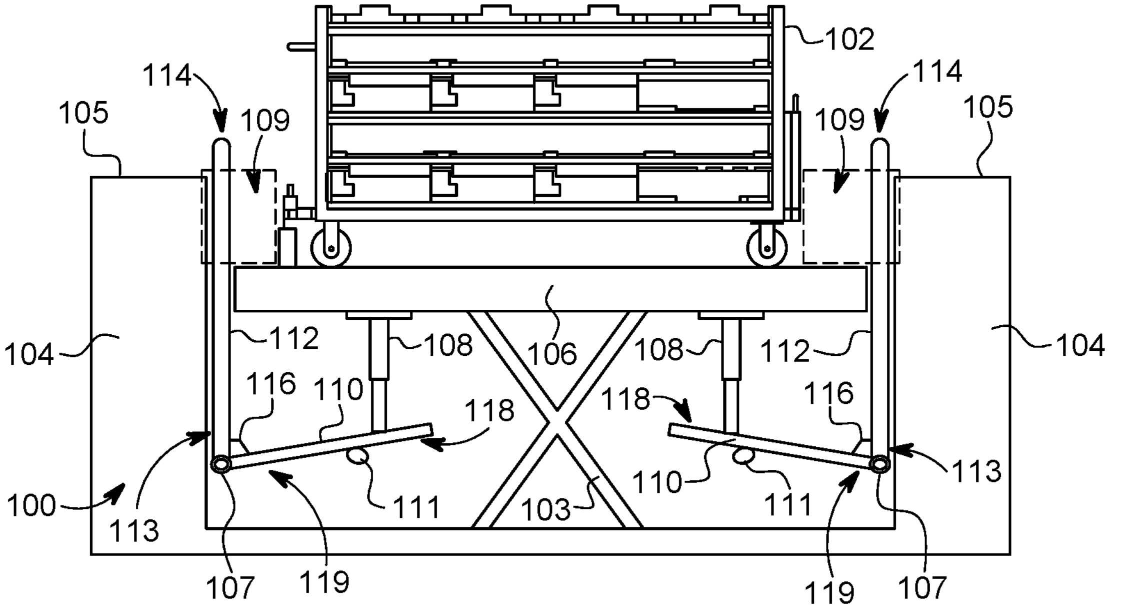
FIG. 2 is a front view of the embodiment of FIG. 1 of the present disclosure in an extended position.

In one embodiment, the barrier system 100 may include a platform lift 106, which is raised or lowered by a variety of means, which are known to those skilled the art. FIGS. 1 and 2 show the barrier system 100 with a lifting mechanism 103. The lifting mechanism 103 is shown schematically as a scissor lift, but it will be appreciated that it could be a pneumatic or hydraulic scissor lifts, hydraulic jack lift, pneumatic jack lift, air bag lift, or screw jack lift, which are known to those skilled the art. In the exemplary embodiments, the barrier system 100 includes a push arm 108, a lever 110, a fulcrum 111, and an upright member 112.

The lever 110 includes a first end 118 and a second end 119. The upright member 112 includes a first end 113 and a second end 114. In the exemplary embodiment, the second end 119 of the lever 110 is engageable with the first end 113 of the upright member 112. The push arm 108 may be mounted to the platform lift 106. As the lifting mechanism 103 lowers the platform lift 106 into the housing 104, the push arm 108 makes contact with first end 118 of lever 110. The continued lowering of the platform lift 106 causes rotation of the lever 110 about the fulcrum 111. The rotation of the lever 110 causes the upright member 112 to move upward, resulting in the second end 114 of the upright member 112 extending past the upper surface 105 of the housing 104.

It will be appreciated that in some embodiments the barrier system 100, the platform lift 106 may directly contact the lever 110 without the push arm 108, depending on the size of the cart 102 and housing 104. Additionally, the housing 104, push arm 108, lever 110, and upright member 112 may be on one side or two sides of the housing 104.

FIG. 2 illustrates the barrier system 100 in an extended position where the second end 114 of the upright member 112 has been raised above the upper surface 105 of the housing 104 to create a barrier or toe guard for an open area 109 formed between the housing 104, platform lift 106, and the cart 102 upon the lowering of the platform lift 106. The open area 109 is shown as a rectangle with dashed lines in FIG. 2. A push arm 108 is shown contacting the lever 110; however, the platform lift 106 may contact the lever 110 directly depending on the depth of the housing 104 and desired height of the object located on top of the platform lift 106.

Figure 3:
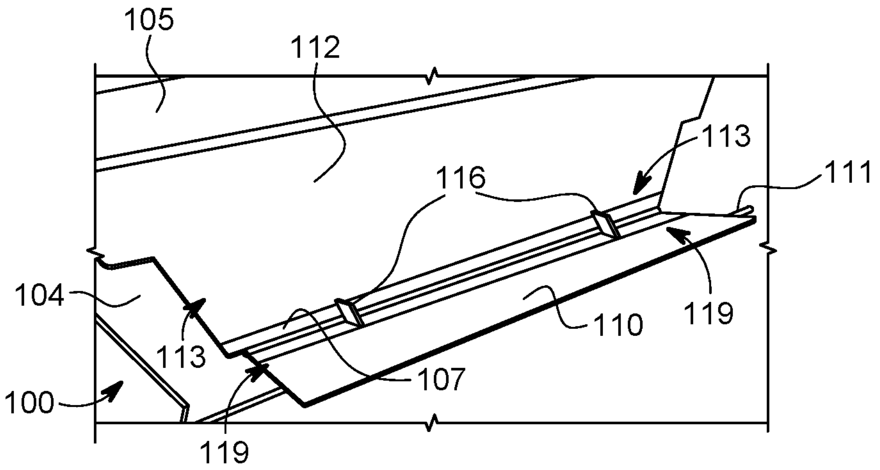
FIG. 3 is a perspective view showing the lever and upright member joined by a hinge.

FIG. 3 is a perspective view of a portion of barrier system 100. In the exemplary embodiment, the barrier system 100 includes a hinge 107. The second end 119 of the lever 110 is coupled to the first end 113 of the upright member 112 by the hinge 107. The hinge 107 may be spring-loaded to help move the upright member 112 to a neutral position as shown in FIG. 1. The barrier system 100 may include stops 116 to control the location of the lever 110 and upright member 112 when a spring-loaded hinge is used. The stops 116 prevent the lever 110 from rotating to an undesired vertical position or the upright member 112 from dropping to an undesired position below the upper surface 105 when the barrier system 100 is in a neutral position, as shown in FIG. 1.

As shown in FIG. 3, the upright member 112 is generally rectangular, but it could alternatively have a shorter width where it contacts the lever and greater width where it exits the housing 104 so that it creates a complete barrier to the opening. Additionally, the lever 110 is shown to be generally rectangular in FIG. 3, but it may have areas removed or cutout to avoid contacting the components of the barrier system 100 as it is raised or lowered.

Figure 4:
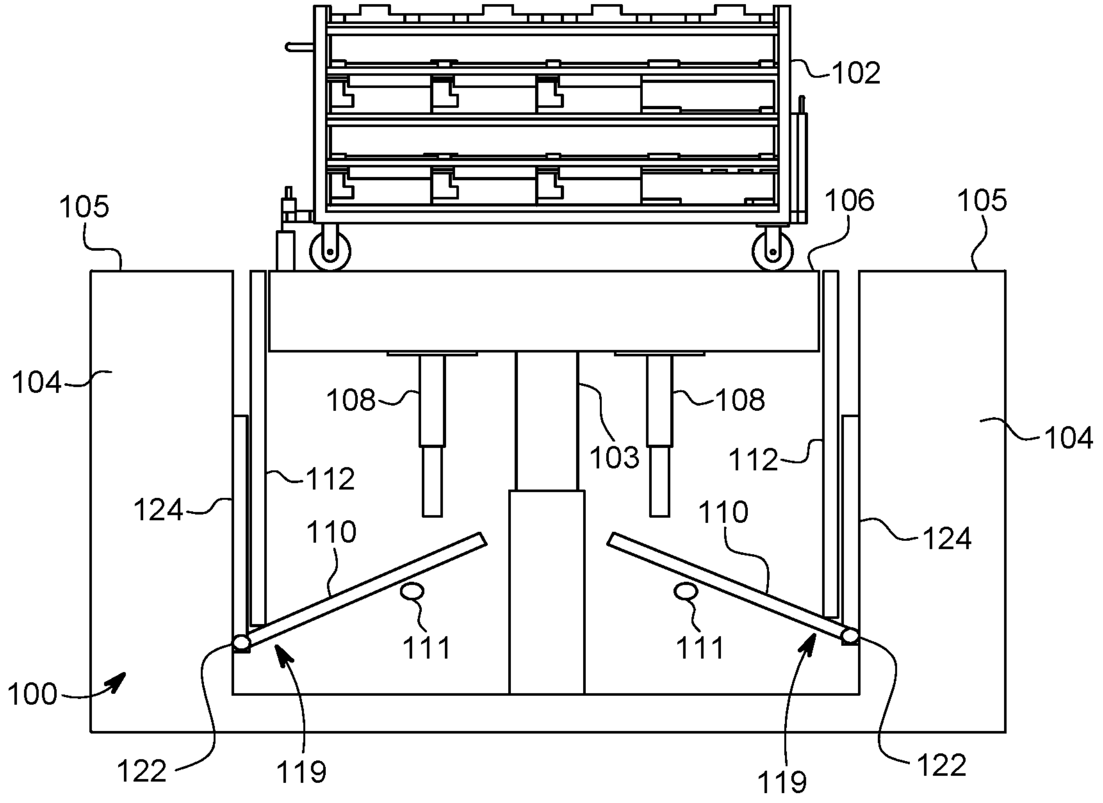
FIG. 4 is a front view of an alternative embodiment in a neutral position.
Figure 5:
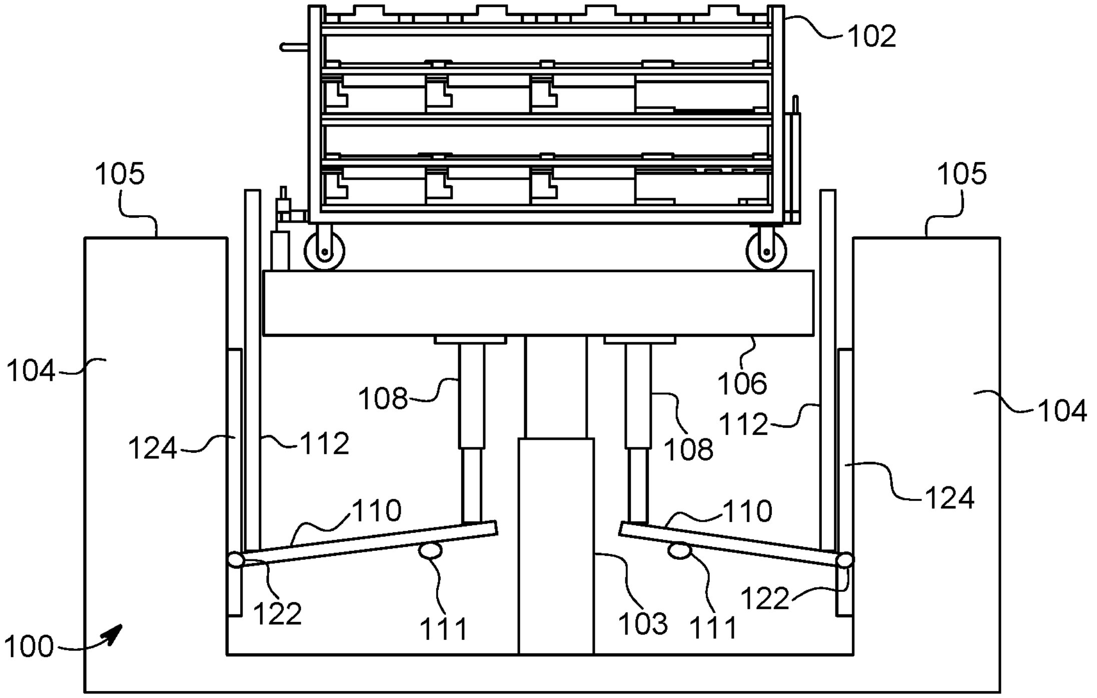
FIG. 5 is a front view of the embodiment of FIG. 4 of the present disclosure in an extended position.

FIG. 4 is a front view of a first alternative embodiment of the barrier system 100. The alternative embodiment barrier system 100 includes a roller mechanism 122 and track 124. The lever 110 may include or be coupled to roller mechanism 122, for example, at the second end 119. As shown in FIGS. 4 and 5, the roller mechanism 122 is contained in a track 124 mounted on the vertical walls of the housing 104. A roller mechanism contained in a track is well known in the industry and roller mechanisms generally include a wheel or spherical object located inside of a track, which is slotted so that the roller may travel in the track without inadvertently leaving the slotted area. FIG. 4 shows the roller mechanism 122 at the bottom of the track 124 when the barrier system 100 is in a neutral position, but it may alternatively rest on a stop inside the track 124 (not shown).

A plurality of roller mechanisms 122 and tracks 124 may be used versus one long roller mechanism and track. FIGS. 4 and 5 show the track 124 located outside of the upright member 112 and mounted on the housing 104. The force of the push arm 108 against the lever 110 causes the lever 110 to rotate about the fulcrum 111. The lever 110 is able to rotate in an upward direction as the roller mechanism 122 travels upward in the track 124. The upward movement of the lever 110 and roller mechanism 122 creates engagement between the upright member 112 and lever. The continued engagement of the lever 110 and upright member 112 as the platform lift 106 is lowered results in the upright member 112 raising above the housing 104 to create a barrier as shown in FIG. 5.

It will be appreciated that the barrier system 100 may just use the platform lift 106 to contact the lever 110 depending on the size of the cart 102 and housing 104. FIGS. 4 and 5 show the components of the barrier system 100 on each side; however, the barrier system 100 may require only one side. FIGS. 4 and 5 show the barrier system 100 with a lifting mechanism 103. The lifting mechanism 103 is shown schematically as a jack lift, but it will be appreciated that it could be a pneumatic or hydraulic scissor lifts, hydraulic jack lift, pneumatic jack lift, air bag lift, or screw jack lifts, which are known to those skilled the art.

Figure 6:
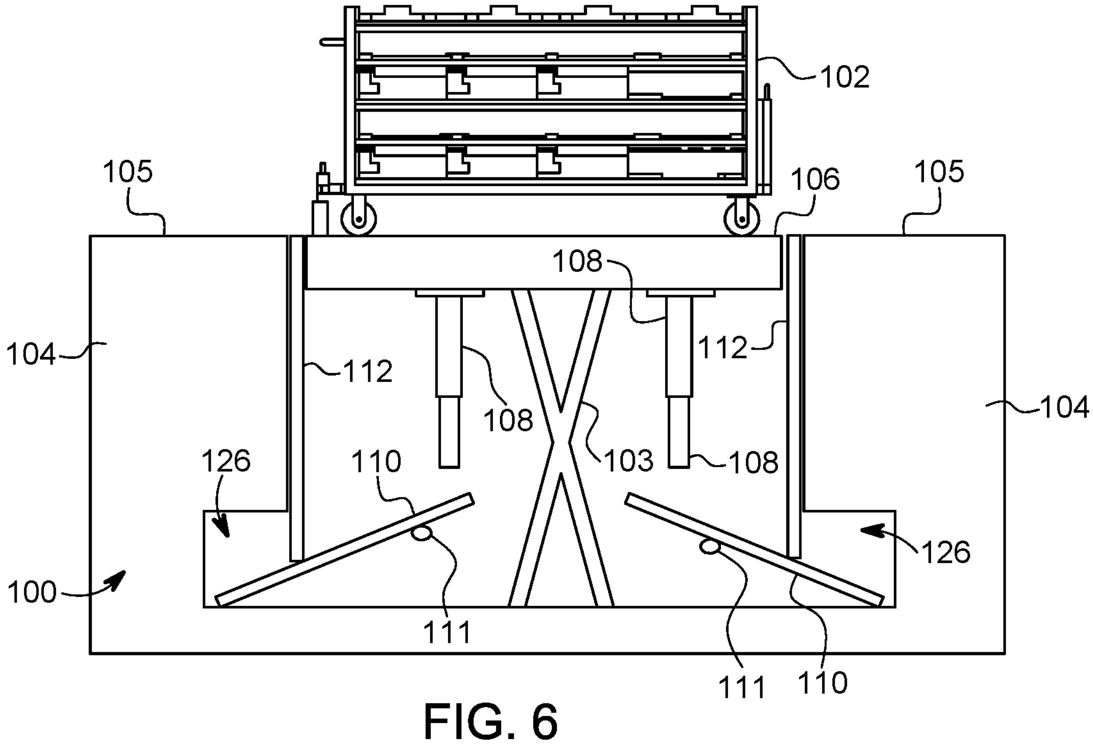
FIG. 6 is a front view of an alternative embodiment in a neutral position.

In another embodiment, the lever 110 may extend into the housing 104 and outside of the upright member 112. FIG. 6 illustrates the lever 110 outside of the upright member 112 and into an enlarged area 126 of the housing while the barrier system 100 is in a neutral position. The enlarged area 126 allows the lever 110 to have space to rotate about the fulcrum 111. The force of the push arm 108 against the lever 110 causes the lever 110 to rotate about the fulcrum 111. The lever 110 is able to rotate in an upward direction as the lever 110 moves in the enlarged area 126. The upward movement of the lever 110 creates engagement between the upright member 112 and lever 110. The continued engagement of the lever 110 and upright member 112 as the platform lift 106 is lowered results in the upright member 112 raising above the housing 104 to create a barrier as shown in FIG. 7.

Figure 7:
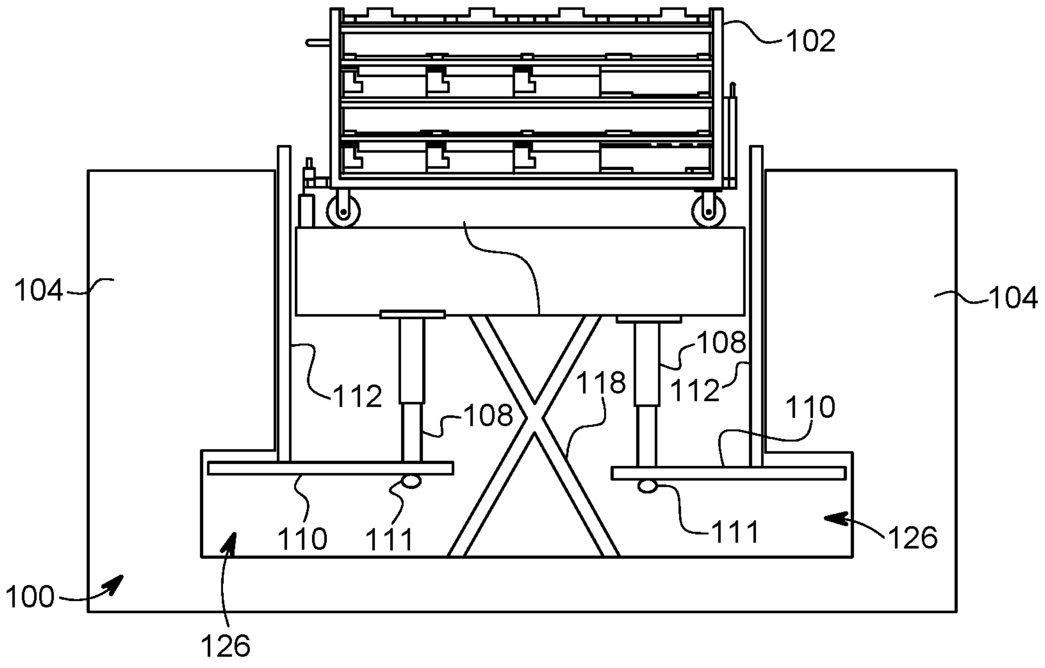
FIG. 7 is a front view of the embodiment of FIG. 6 of the present disclosure in an extended position.

It will be appreciated that the barrier system 100 shown in FIGS. 6 and 7 may just use the platform lift 106 to contact the lever 110 depending on the size of the cart 102 and housing 104. Moreover, FIGS. 6 and 7 show the components of the barrier system 100 on each side; however, the barrier system 100 may require only one side. Also, FIGS. 6 and 7 show the barrier system 100 with a lifting mechanism 103. The lifting mechanism 103 is shown schematically as a scissor lift, but it will be appreciated that it could be a pneumatic or hydraulic scissor lifts, hydraulic jack lift, pneumatic jack lift, air bag lift, or screw jack lifts, which are known to those skilled the art.

Figure 8:
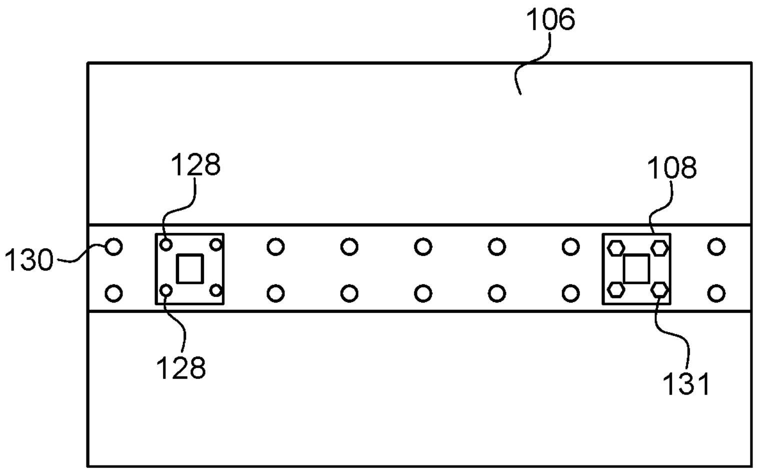
FIG. 8 is a partial bottom view of the platform lift and push arms of FIG. 1.

FIG. 8 is a bottom view of platform lift 106. In the exemplary embodiment, the platform lift 106 includes mounting holes 130 and the push arm 108 includes mounting holes 128 that allow adjustability in mounting the push arm 108 to the platform lift 106. The push arm 108 has mounting holes 128 and is shown in FIG. 8 to be fastened to the bottom of the platform lift 106 in a corresponding mounting hole 130 in the platform lift 106. The platform mounting holes 128 and the push arm mounting holes 130 may be threaded to allow the push arm 108 to be fastened with bolts 131. However, a variety of fastening means may be used to secure the push arm 108 to the platform lift 106.

Figure 9:
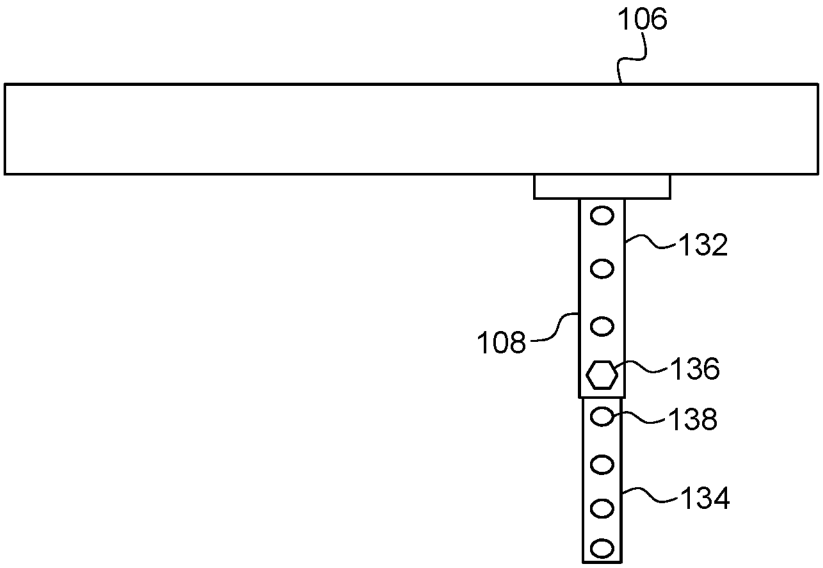
FIG. 9 is a partial front view of the platform lift and push arm of FIG. 8.
Figure 10:
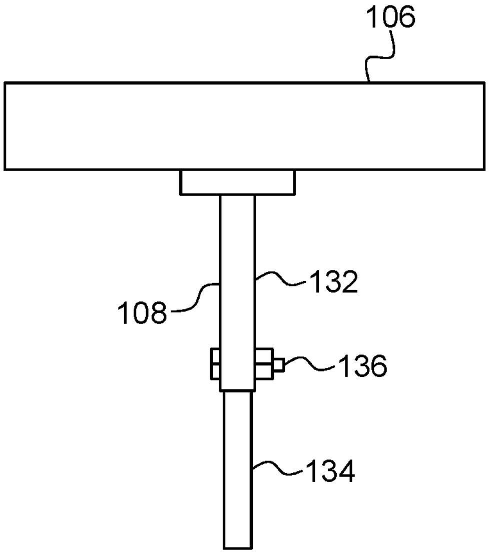
FIG. 10 is a partial side view of the platform lift and push arm of FIG. 8.

FIG. 9 is a front view of the platform lift 106 and push arm 108. FIG. 10 is a side view of the platform lift 106 and push arm 108. The push arm 108 is adjustable in an up and down direction. The push arm 108 consists of a top piece 132, which may be t-shaped at where it mounts to the platform. The top piece 132 has a hollow tubular structure extending downward. Additionally, the push arm 108 includes a bottom piece 134, which is also a tubular structure. The bottom piece 134 is smaller in diameter or width than the top piece 132 so that it may be inserted into the top piece 132. The top piece 132 and the bottom piece 134 each have mounting holes through their respective tubular structure. The length of the push arm is adjusted by inserting the bottom piece 134 into the top piece 132, aligning the mounting holes 138 of each piece once the desired length is achieved, and inserting a fastener 136 through the mounting holes of each piece as shown in FIG. 10.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A barrier system for a manufacturing environment comprising:

a housing;

a platform lift for supporting an object, the platform lift movable into the housing;

an upright member configured to be received in the housing and moveable in an up and down direction; and a lever pivotable about a fulcrum between a first end and a second end of the lever;

the second end of the lever directly coupled to a first end of the upright member disposed in the housing;

wherein the platform lift is moveable into the housing to engage with the lever to move the upright member out of the housing to form a barrier to the housing.

2. The barrier system according to claim 1, further comprising a moving mechanism, wherein the moving mechanism comprises a hinge directly coupling the second end of the lever to the first end of the upright member and moves the upright member in response to contact between the lever and the platform lift to create the barrier to the housing.

3. The barrier system according to claim 1, further comprising a moving mechanism including a roller mechanism disposed on one end of the lever, said roller mechanism configured to be inside of a track located along the housing which allows upward movement of the lever when engaged with the platform lift, the upward movement of the lever moves the upright member out of the housing in response to contact between the lever and upright member.

4. The barrier system according to claim 1, further comprising a push arm mounted to the platform lift with a tubular structure extending downward from the platform lift to contact the first end of the lever.

5. The barrier system according to claim 4, wherein the push arm is adjustably mounted to the platform lift.

6. The barrier system according to claim 4, wherein the tubular structure of the push arm is adjustable in an up and down direction.

7. The barrier system according to claim 1, wherein the fulcrum is a rod directly attached to the housing.

8. The barrier system according to claim 1, wherein the fulcrum contacts the lever between the first end and the second end of the lever.

9. The barrier system according to claim 1, further comprising at least one stop secured to the hinge for controlling the rotation of the lever and the upright member when not contacting the platform lift.

10. A barrier system for a manufacturing environment comprising:

an upright member moveable in an up and down direction;

a lever with a first end and a second end;

a fulcrum located between the first end and the second of the lever;

the lever engageable with the fulcrum and the upright member; and a platform lift for supporting an object;

wherein the platform lift is movable to engage the lever to pivot about the fulcrum and move the upright member up to form a barrier.

11. The barrier system according to claim 10, further comprising a moving mechanism, wherein the moving mechanism comprises a spring-loaded hinge that moves the upright member in response to contact between the lever and the platform lift to create the barrier to the housing.

12. The barrier system according to claim 10, further comprising a push arm mounted to the platform lift with a tubular structure extending downward from the platform lift to contact the first end of the lever.

13. The barrier system according to claim 12, wherein the push arm adjustably mounted to the platform lift.

14. A barrier system according to claim 12, wherein the tubular structure of the push arm is adjustable in an up and down direction.

15. The barrier system according to claim 10, further comprising at least one stop for controlling the rotation of the lever and the upright member when not contacting the platform lift.

16. A barrier system for a manufacturing environment comprising:

an upright member with a first end and a second end moveable in an up and down direction;

a lever directly coupled to the first end of the upright member with a hinge;

the hinge further comprising a first planer member attached to the lever and a second planar member attached to the upright member; and a platform lift for supporting an object;

wherein the platform lift is movable to engage the lever and move the upright member up to form a barrier.

17. The barrier system according to claim 16, further comprising a push arm mounted to the platform lift with a tubular structure extending downward from the platform lift to contact the first end of the lever.

18. The barrier system according to claim 17, wherein the push arm includes a top piece that is adjustably mounted to the platform lift.

19. A barrier system according to claim 17, wherein the tubular structure of the push arm is adjustable in an up and down direction.

20. The barrier system according to claim 16, further comprising at least one stop secured to the first planar member of the hinge for controlling the rotation of the lever when not contacting the platform lift.

* * * * *